United States Patent Office 2,934,275
Patented Apr. 26, 1960

2,934,275

METHOD AND COMPOSITION FOR DISPELLING FOG AND THE LIKE

Arthur L. Ball, Inglewood, Calif., assignor to NoFog Corporation, a corporation of Nevada No Drawing. Application February 21, 1957
Serial No. 641,456

11 Claims. (Cl. 239—2)

This invention relates to a method of dispelling, dispersing, or precipitating fogs and clouds, and to compositions for use in the process.

The problems presented to both aerial and marine navigation by fogs and clouds are so well known that little description is needed. It is, of course, a matter of common knowledge that airports are frequently rendered temporarily inoperable by the presence of fog at so low an altitude, often reaching the ground level itself, that landing of planes and even the take-off thereof is not possible, in some cases even with the most modern navigational aids. Fog also is of great hindrance in shipping, and even with radar, ships cannot safely enter or leave a port where lateral clearances are small.

A number of proposals have been made for dispelling fog, such as blowing heated air into the fog, attempting ultrasonic precipitation, and spraying with various chemicals. None of these has proved to be both feasible and economical.

It is an object of this invention to provide a method for dispelling fog as well as compositions therefor.

Further objects will become apparent as the description thereof proceeds.

I have discovered that if a liquid mixture of a certain type to be described more fully hereinbelow is atomized, as for example by forcing the liquid mixture through a spray nozzle, or jetting it against a rapidly rotating disk at high pressure, so that a mist comprising droplets of the liquid mixture is formed, and if this mist is then incorporated with the fog to be dispelled, as by blowing it into the fog with blowers, as in a stationary installation, or flying over or through the fog in an airplane or helicopter and spraying the fog with my mixture, very rapid precipitation of the fog occurs, and the area so treated is rendered available for navigation. The precipitation of the fog is of such a nature that the same process may conveniently be applied to clouds for the purpose of rain making, and, of course, to clouds generally whenever it is desired to remove them from a given location.

In order to form the fog dispelling mixture used in my process, I make an aqueous solution of a salt chosen from the class consisting of calcium chloride, magnesium chloride, and zinc chloride, to which I add a thickening agent which may be sugar, or a hydrolyzed starch such as dextrin, corn syrup, or the like, or a hydrolyzed protein, such as the mixture which is predominantly an amino acid mixture obtained by the hydrolysis of proteins, such as animal proteins, with acid, alkali, or enzymes.

This mixture is used in conjunction with a normally liquid chlorinated aliphatic hydrocarbon, such as carbon tetrachloride. The chlorinated hydrocarbon is conveniently mixed with the aqueous solution of the salt and the thickening agent prior to forming the mixture of the two into a mist or spray. It has also been found that the chlorinated hydrocarbon can be sprayed into a mist in one spray nozzle, and the aqueous solution containing the other materials mentioned may be simultaneously formed into a mist or spray through a second nozzle, with both mists being commingled and passed into the fog or cloud to be dispelled. Likewise, where a high-speed rotating disk is used for forming the spray, a jet of chlorinated hydrocarbon and a jet of the aqueous solution may be simultaneously impinged against the disk, or more conveniently the chlorinated hydrocarbon may be mixed with the aqueous solution and the mixture or emulsion formed impinged against the disk.

I prefer to form a quite fine spray, and in general a spray of the liquids which have been described in which the particles are not greater than about ½ millimeter in diameter. Indeed, generally speaking, the liquid composition is more efficiently used when the spray particles are more of the order of $1/10$ millimeter in diameter. There is no particular lower limit to the diameter of an effective mist, but, of course, it will be appreciated that the production of an exceedingly finely divided spray involves considerable mechanical work to be expended on the liquid mixture. I have had excellent results by the use of a spray nozzle of the type commonly used in cooling towers and readily available industrially, with the mixture being pumped to the spray nozzle at from between 150 lbs. per square inch and 250 lbs. per square inch pressure. Such pressures are readily obtained with a gear pump; or the mixture may be put in a pressure tank and air or other gas pressure applied from a cylinder of compressed gas, so that sufficient pressure is obtained to form a spray of the character desired and described.

The salts which are usable, namely, the chlorides of calcium, magnesium, and zinc, are all highly deliquescent materials, and are readily available. I prefer calcium chloride because of its low cost and great effectiveness. The dry calcium chloride may be used, or concentrated solutions such as are available commercially. The thickening agent may be sugar, such as sucrose, dextrose, levulose, or invert sugar; or it may be products very close to sugar but of somewhat higher molecular weight, such as are obtained by the acid or enzymatic hydrolysis of starches. Such products are dextrins, particularly of low molecular weight, and the mixture of low molecular weight dextrines with dextrose widely available as corn syrup. Another thickening agent, and one which I particularly prefer, is hydrolyzed protein, which again is commonly available and is obtained by taking any low cost protein, such as the wastes available in abbatoirs and fish canneries, and subjecting the waste to hydrolysis, generally with an acid, although an enzymatic hydrolysis may be used so that the protein is reduced to its constituent amino acids. A highly water-soluble mixture is obtained, and one which appears to function in my mixture about the same as the sugar or hydrolyzed starch.

The chlorinated hydrocarbon is any chlorinated aliphatic hydrocarbon which is liquid at normal room temperatures and may be carbon tetrachloride, chloroform, methylene chloride, ethylene dichloride, trichloroethylene, tetrachloroethylene, and the like. As I have mentioned, I prefer carbon tetrachloride because of its effectiveness, availability, and relatively low cost. Where toxicity is a problem as for example when a fog is to be dispelled in an airport surrounded by residential or business sections, trichloroethylene may be used with good results and is considerably less toxic than carbon tetrachloride.

As I have indicated, I prefer to mix the chlorinated hydrocarbon with the aqueous solution of salt and thickening agent prior to spraying the joint mixture into a mist. The thickening agent has some tendency to permit an emulsion to be formed when the chlorinated hydrocarbon is mixed with the aqueous solution, particularly if agitation is employed. In any case, it is advisable to keep the joint mixture under sufficient agitation so that a uniform composition of ingredients is presented to the spray nozzle. Some of the chlorinated hydrocarbons are considerably denser than water and tend to settle out, even from the aqueous solution. It is of considerable benefit to add an additional emulsifying agent to the solution when premixing of the chlorinated hydrocarbon is employed. Emulsifying agents which are surface active agents, as defined for example in the book "Surface Active Agents" by Schwartz and Perry, New York 1949, may be employed. For example, the sodium salts of the half sulphate esters of long chain alkyl radicals, such as sodium octyl sulphate, and analogous compounds available from the Carbide and Carbon Company as Tergitol 4 and Tergitol 7 may be used. Likewise, sorbitan esters of long chain fatty acids, and fatty acid esters of polyoxyethylene may be advantageously used. The latter types of compounds are available commercially from the Atlas Powder Company. Saponins of plant origin may be used. All of these serve to stabilize the emulsion formed when the chlorinated hydrocarbon is agitated with the aqueous solution, and it will be evident that any emulsifying agent effecting such an emulsification will be suitable. A number of emulsifying agents have been made commercially available in recent years for forming emulsions of certain chlorinated insecticides, such as DDT, and these are particularly suitable.

Whether or not the chlorinated hydrocarbon is emulsified or mixed in any way with the aqueous solution prior to spraying, it is advantageous to reduce the surface tension of the aqueous solution of salt and thickening agent, with or without the chlorinated hydrocarbon, with a suitable surface active agent. The purpose of this is to permit the formation of fine droplets for any given conditions of pressure and type of spray nozzle. A surface tension reduction to about 50 dynes per centimeter or less gives good results. Any of the emulsifying agents set forth in the previous paragraph, which at the same time are surface active agents, may be used for this purpose.

The proportions of the several ingredients may be varied within a wide range. In general, no more water need be used than is necessary to dissolve the salt and thickening agent, but on the other hand, too concentrated solutions are more difficult to spray and also do not have a great covering power. I have found in general from about 1 to about 5 lbs. of salt, such as calcium chloride, may be used to each gallon of water with good results, and from about ¼ lb. to 1½ lbs. of thickening agent, such as sugar, hydrolyzed protein, or hydrolyzed starch, may be advantageously employed. The chlorinated hydrocarbon may be used conveniently at volume ratios of about 5 to 30% of that of the water, that is, from about $\frac{1}{20}$ gallon to about 0.3 gallon of chlorinated hydrocarbon, such as carbon tetrachloride, for each gallon of water employed. It will be evident, however, that the proportions are capable of variation within wide relative ranges, provided, of course, that the amount of any one constituent, viz. salt, thickening agent, or chlorinated hydrocarbon, is not so low that it is negligible.

I have found it further advantageous to employ carbon dioxide at a very low temperature in conjunction with the spray or mist at the time that it is intermingled with the fog or cloud to be dispelled. A convenient procedure is to permit the escape of carbon dioxide from its liquid state, contained in a suitable pressure vessel, through a spray nozzle. Upon passing through the nozzle, the carbon dioxide is transformed into minute particles of carbon dioxide snow or "Dry Ice," and with certain types of fogs and clouds, I have found this additional component to be of benefit. It is optional, however, and need not be used in every case. It is also advantageous to use Dry Ice itself, that is, solid carbon dioxide, which is comminuted by a suitable grinder or shaver and introduced into the cloud or fog simultaneously with the liquid mist. In some cases, it is even satisfactory to mix the Dry Ice directly with the liquid mixture prior to spraying, but care must, of course, be taken that the liquid mixture does not freeze and plug the spray nozzle. However, the freezing point of the liquid mixture is lowered substantially by the presence of the salt and thickening agent so that the liquid mixture can be brought to a quite low temperature in this manner prior to spraying and the presence of a substantial amount of carbon dioxide in the mixture enables some of the benefits of this latter component to be realized.

Some specific examples will now be given, of which Example 3 is particularly useful:

*Example 1*

| | | |
|---|---|---|
| Calcium chloride | lbs. | 20 |
| Hydrolyzed waste fish protein | lbs. | 5 |
| Water | gals. | 5 |
| Carbon tetrachloride | gal. | 0.6 |

The hydrolyzed protein and calcium chloride are dissolved in the water, the carbon tetrachloride is dispersed in the water with agitation, and the whole is sprayed into the fog to be dispelled.

*Example 2*

Two and one-half pounds of Dry Ice are comminuted and added to the mixture of Example 1 prior to spraying.

*Example 3*

Five pounds of liquid carbon dioxide is formed into a finely divided snow by release through a spray nozzle, and the snow is commingled with the spray of Example 1.

*Example 4*

| | | |
|---|---|---|
| Calcium chloride | lbs. | 14 |
| Sugar | lb. | 1 |
| Water | gal. | 4 |
| Carbon tetrachloride | gal. | 1 |

The sugar and calcium chloride are dissolved in the water and this solution sprayed into the cloud or fog at the same time that the carbon tetrachloride is sprayed therein.

The reasons for the unusual and unexpected effectiveness of mixtures of the type described and used as has been described is not entirely clear. At the present time, no satisfactory theory can be advanced, and it will be appreciated that the problem is most complicated from a physical, chemical, and electrokinetic standpoint. I believe it likely, however, that the droplets containing calcium chloride serve as nuclei for the condensation and precipitation of the fog and that the physical state of the salted droplet, as for example of calcium chloride, is particularly modified for this purpose by the presence of the thickening agent. The chlorinated hydrocarbon is beneficially effective by doubtless modifying in some fashion the electric charge which otherwise acts as a bar to condensation and precipitation, since one, of course, expects an aqueous droplet to have a negative charge precisely like that of a fog or cloud water droplet. The reason that a fog remains as such, of course, is connected with the difficulty of causing two fog particles to come close enough for coalescence because of the electrostatic repulsion between them. It appears that the use of a chlorinated hydrocarbon has solved this difficulty for the first time in this art and has contributed to the success of my composition and process, a success which has been verified on numerous occasions in dispelling both fog and clouds at various locations in the United States, particularly in Southern California.

The claims which follow recite a process of dispelling fog, and it will, of course, be readily understood that this is meant to include dispelling clouds as well, for simple dispersal or for the purpose of rain making.

It will be appreciated that the invention is a broad one and that numerous modifications and changes may be made among the several ingredients and proportions,

What I claim is:

1. The process of dispelling fog which comprises: forming a mixture of an aqueous solution of a salt chosen from the class consisting of calcium chloride, magnesium chloride, and zinc chloride together with a thickening agent chosen from the class consisting of hydrolyzed starches, sugars, and hydrolyzed proteins into a mist having substantially all the particles thereof smaller than about ½ millimeter in diameter; forming a normally liquid chlorinated aliphatic hydrocarbon into a mist having substantially all the particles thereof smaller than about ½ millimeter in diameter; and commingling said mist with the fog to be treated.

2. The process of dispelling fog which comprises: forming a mixture of an aqueous solution of a salt chosen from the class consisting of calcium chloride, magnesium chloride, and zinc chloride with a thickening agent chosen from the class consisting of hydrolyzed starches, sugars, and hydrolyzed proteins, and containing a normally liquid chlorinated aliphatic hydrocarbon dispersed therein, into a mist having substantially all the particles thereof smaller than about ½ millimeter in diameter, and commingling said mist with the fog to be treated.

3. The process of dispelling fog which comprises: forming a mixture of an aqueous solution of a salt chosen from the class consisting of calcium chloride, magnesium chloride, and zinc chloride together with a thickening agent chosen from the class consisting of hydrolyzed starches, sugars, and hydrolyzed proteins into a mist having substantially all the particles thereof smaller than about ½ millimeter in diameter; forming a normally liquid chlorinated aliphatic hydrocarbon into a mist having substantially all the particles thereof smaller than about ½ millimeter in diameter; forming a mist of comminuted solid carbon dioxide; and commingling said mist with the fog to be treated.

4. The process of dispelling fog which comprises: forming a mixture of an aqueous solution of a salt chosen from the class consisting of calcium chloride, magnesium chloride, and zinc chloride together with a thickening agent chosen from the class consisting of hydrolyzed starches, sugars, and hydrolyzed proteins into a mist having substantially all the particles thereof smaller than about ½ millimeter in diameter; forming a normally liquid chlorinated aliphatic hydrocarbon into a mist having substantially all the particles thereof smaller than about ½ millimeter in diameter; introducing solid carbon dioxide into said aqueous solution to an extent less than that necessary to freeze said solution prior to said forming of said aqueous solution into said mist; and commingling said mist with the fog to be treated.

5. The process of dispelling fog which comprises: forming a mixture of an aqueous solution of calcium chloride and hydrolyzed protein into a mist having substantially all the particles thereof smaller than about ½ millimeter in diameter, forming carbon tetrachloride into a mist having substantially all the particles thereof smaller than about ½ millimeter in diameter, and commingling said mist with the fog to be treated.

6. The process of claim 1 in which a surface active agent is added to said aqeous solution prior to forming said mist.

7. The process of claim 2 in which an emulsifying agent is incorporated with said aqueous solution prior to the time that it is formed into said mist.

8. The process of claim 1 in which said salt is present in said solution in an amount within the range of about one pound to about five pounds per gallon of water used, said thickening agent is present in said solution in an amount of from about one-quarter to about one and one-half pounds per gallon of water used, and said normally liquid chlorinated hydrocarbon is present in an amount between about 5% and about 30% by volume of said water used.

9. A composition for dispelling fog consisting essentially of a mixture of an aqueous solution of a salt chosen from the class consisting of calcium chloride, magnesium chloride, and zinc chloride with a thickening agent chosen from the class consisting of hydrolyzed starches, sugars, and hydrolyzed proteins, and containing a normally liquid chlorinated aliphatic hydrocarbon dispersed therein.

10. The composition of claim 9 in which said salt is present in said solution in an amount within the range of about one pound to about five pounds per gallon of water used, said thickening agent is present in said solution in an amount of from about one-quarter to about one and one-half pounds per gallon of water used, and said normally liquid chlorinated hydrocarbon is present in an amount between about 5% and about 30% by volume of said water used.

11. The composition of claim 9 in which the salt is calcium chloride, and in which the chlorinated aliphatic hydrocarbon is carbon tetrachloride.

References Cited in the file of this patent

UNITED STATES PATENTS

| | | |
|---|---|---|
| 462,795 | Gathmann | Nov. 10, 1891 |
| 2,160,900 | Pleasants | June 6, 1939 |
| 2,570,867 | Schaefer | Oct. 9, 1951 |
| 2,665,168 | Kerlin | Jan. 5, 1954 |
| 2,797,198 | Chappell | June 25, 1957 |

FOREIGN PATENTS

| | | |
|---|---|---|
| 488,479 | Germany | Dec. 28, 1929 |

OTHER REFERENCES

"On the Local Dissipation of Natural Fog" by H. G. Houghton et al. from Papers in Physical Oceanography and Meteorology, volume VI, Number 3, pages 27, 28, 30, 31 and 40–49.